(12) United States Patent
Schutte et al.

(10) Patent No.: US 9,736,338 B2
(45) Date of Patent: Aug. 15, 2017

(54) IMAGE COLOR CORRECTION (71) Applicant: Nederlandse Organisatie voor toegepast-natuurwetenschappelijk onderzoek TNO, 's-Gravenhage (NL)

(72) Inventors: Klamer Schutte, 's-Gravenhage (NL); Judith Dijk, 's-Gravenhage (NL)

(73) Assignee: NEDERLANDSE ORGANISATIE VOOR TOEGEPAST— NATUURWETENSCHAPPELIJK ONDERZOEK TNO, 'S-Gravenhage (NL)

(*) Notice: Subject to any disclaimer, the term of this patent is extended or adjusted under 35 U.S.C. 154(b) by 0 days.

(21) Appl. No.: 14/786,247

(22) PCT Filed: Apr. 22, 2014

(86) PCT No.: PCT/NL2014/050258
§ 371 (c)(1),
(2) Date: Oct. 22, 2015

(87) PCT Pub. No.: WO2014/175729
PCT Pub. Date: Oct. 30, 2014

(65) Prior Publication Data
US 2016/0088194 A1  Mar. 24, 2016

(30) Foreign Application Priority Data
Apr. 22, 2013 (EP) .................. 13164740

(51) Int. Cl.
*G06K 9/00* (2006.01)
*H04N 1/60* (2006.01)
(Continued)

(52) U.S. Cl.
CPC ......... *H04N 1/6077* (2013.01); *G06T 3/4007* (2013.01); *G06T 5/001* (2013.01);
(Continued)

(58) Field of Classification Search
None
See application file for complete search history.

(56) References Cited

U.S. PATENT DOCUMENTS 5,652,831 A * 7/1997 Huang .................. G06T 11/001
345/604
5,719,639 A * 2/1998 Imamura ............... G06T 11/001
345/603
(Continued)

FOREIGN PATENT DOCUMENTS

JP  2004-282460  10/2004
JP  2007-104267  4/2007

OTHER PUBLICATIONS

Shamsuddin et al,; "Image Enhancement of Underwater Habitat Using Color Correction Based on Histogram", pp. 289-299; 2011.
(Continued)

*Primary Examiner* — Feng Niu
(74) *Attorney, Agent, or Firm* — Pillsbury Winthrop Shaw Pittman LLP (57) ABSTRACT

Corrected color components are obtained that correspond to an interpolation between a first and second corrected color component vector, in the first vector the color component are scaled to move a characteristic color component vector towards a target and in the second set the color components are contracted towards a reference determined by part of the color components. A position of the interpolation between the first and second corrected color component vectors is controlled by an interpolation coefficient computed from a ratio of an average value of the at least one of the color component in the input image or one or more reference images with similar content and an average obtained from the other color components of the input image or the or one or more reference images with similar content. The position (Continued)

of the interpolation is moved increasingly toward the second corrected color component vector with decreasing values of said ratio.

16 Claims, 3 Drawing Sheets

(51) Int. Cl.
    *H04N 9/68*     (2006.01)
    *H04N 9/73*     (2006.01)
    *G06T 3/40*     (2006.01)
    *G06T 5/00*     (2006.01)
    *H04N 9/04*     (2006.01)
    *G06T 7/90*     (2017.01)

(52) U.S. Cl.
    CPC ............... *G06T 7/90* (2017.01); *H04N 9/04* (2013.01); *H04N 9/68* (2013.01); *H04N 9/735* (2013.01); *G06T 2207/10024* (2013.01)

(56) References Cited

U.S. PATENT DOCUMENTS

| | | | |
|---|---|---|---|
| 6,267,051 | B1 | 7/2001 | Feldman et al. |
| 6,961,066 | B2 * | 11/2005 | James ............... G06T 5/009 |
| | | | 345/426 |
| 7,945,091 | B2 * | 5/2011 | Utsugi ............... H04N 9/045 |
| | | | 382/162 |
| 2006/0114335 | A1 | 6/2006 | Hara et al. |
| 2007/0153341 | A1 | 7/2007 | Kang |
| 2009/0180687 | A1 * | 7/2009 | Zhu ............... G06T 3/4015 |
| | | | 382/167 |
| 2009/0196498 | A1 | 8/2009 | Quan |
| 2011/0228074 | A1 | 9/2011 | Parulski et al. |

OTHER PUBLICATIONS

Torres-Mendez et al.; "Color Correction of Underwater Images for Aquatic Robot Inspection", pp. 60-73, 2005.
International Search Report dated Jul. 2, 2014 for Appln. No. PCT/NL2014/050258.

* cited by examiner

IMAGE COLOR CORRECTION

CROSS-REFERENCE TO RELATED APPLICATIONS

This is the U.S. National Stage of PCT/NL2014/050258, filed Apr. 22, 2014, which in turn claims priority to European Application No. 13164740.6, filed Apr. 22, 2013, the entire contents of all applications are incorporated herein by reference in their entireties.

FIELD OF THE INVENTION

The invention relates to an image processing system and an image color correction method.

BACKGROUND

Under circumstances such as underwater imaging, selective damping of part of the color spectrum by the medium between objects and the camera or the objects and a light source can distort the relation between colors of the objects in the image. At depths of around 50 meters, little or nothing is left of the incoming blue light component. The problem of color selective damping can also occur in other circumstances. Similar problems may occur with images of a scene lighted by a colored light source.

Various standard color correction methods are available for correcting such images. For example, the average grey correction method applies different correction factors to different color channels such that the average of the color pixel values over the image has zero color saturation. As an alternative, the maximum white correction method uses correction factors that result in zero color saturation of the pixels with the highest overall intensity.

However, such techniques do not give satisfactory results if one or more color channels are strongly damped or selectively lighted. In this case, the resulting correction factor for such a channel can become very large and inaccurate, in which case the corrected value may show large errors. Moreover, in underwater imaging, the relative strength of the incoming color components can change with depth so that a method of correction that works well in one depth range may not work well in other depth ranges.

SUMMARY

Among others, it is an object to provide for an improved correction method.

An image color correction method as claimed in claim 1 is provided. Herein corrected color components are obtained that correspond to an interpolation between a first and second corrected color component vector, wherein the color component values are scaled to move a characteristic of the color component values towards a target and wherein the color components are contracted towards a reference determined by part of the color components respectively.

A position of the interpolation between the first and second corrected color component vectors is controlled by an interpolation coefficient computed from a ratio of an average value of the at least one of the color component of the original color component vectors in the input image or one or more reference images with similar content and an average obtained from the other color component values of the input image or the one or more reference images with similar content. The position of the interpolation is moved increasingly toward the second corrected color component vector with decreasing values of said ratio.

The first corrected color component vector corresponds to a correction that draws a characteristic vector of the color components in the input image towards a target vector, with substantially parallel transformation of other color component vectors. An example is a white correction, with scale factors for the different color components selected so that the characteristic vector moves towards a grey vector.

The second corrected color component vector corresponds to a correction that draws the value of the color components towards locations in a reference color component plane defined by part of the color components in the input image. The latter correction involves at least partly replacing at least one color component by a value based on one or more of the other color components.

The method is particularly advantageous for processing a video stream (i.e. a sequence of images for successive display. Use of a gradually varying interpolation coefficient A reduces artifacts that would otherwise be disturbing during video display.

In an embodiment, the corrected image correspond to an interpolation between the original color components, a first result of scaling all color components and a second result of replacement of at least one of the color components of the input image by values computed from the other color components of the input image. Thus, the interpolation is within a triangle. Preferably, the interpolation lies closer to the leg of the triangle between the first and second results than to the original color components. The position between a first leg from the original color components to the first result and a second leg from the original color components to the second result is controlled by the interpolation coefficient computed from the ratio. Use of the second result makes it possible to decrease the influence of the first result when the ratio is low, thus avoiding unnatural color.

The at least one of the color component may be a blue component for example. In underwater imaging incoming blue light intensity varies with depth. By adjusting the correction dependent on a ratio of the blue color components and one or more of the other color components (e.g. red, green or the average of red and green) compensation of the correction for depth is made possible.

BRIEF DESCRIPTION OF THE DRAWING

These and other objects and advantageous aspects will become apparent from a description of exemplary embodiment using the following figures

DETAILED DESCRIPTION OF EXEMPLARY EMBODIMENTS

Figure 1:
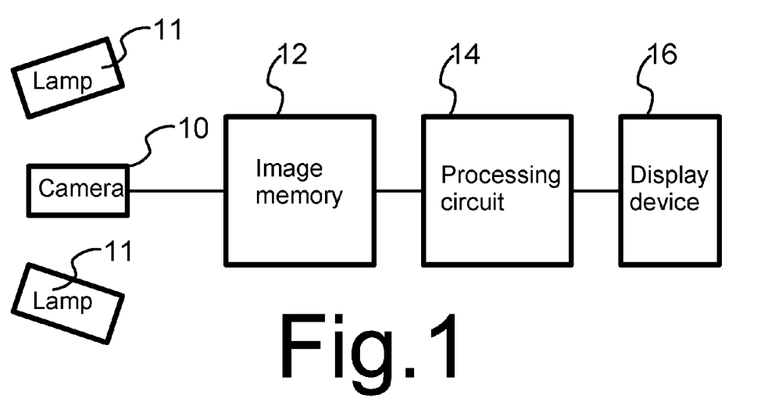
FIG. 1 shows an image processing system

FIG. 1 shows an exemplary image processing system comprising a camera 10, an image memory 12, a processing circuit 14 and an optional display device 16. Optionally, camera 10 is used in combination with one or more lamps 11 for lighting a scene imaged by camera 10. An underwater camera system may comprise a watertight housing, preferably constructed to withstand water pressures of at least 0.25 MPa, and more preferably 0.5 MPa, i.e. at depths of at least fifty meters, with camera 10, an image memory 12, a processing circuit 14 in said housing.

Image memory 12 is coupled to camera 10 and processing circuit 14. Processing circuit is coupled to display device 16. In operation, camera 10 captures images and stores data representing the images in image memory 12, processing circuit 14 processes the data and supplies corrected data to display device 16. Display device 16 uses the corrected data to control display of images. It should be emphasized that the exemplary system of FIG. 1 is shown only by way of example. Other configurations are possible. For example, display device 16 maybe coupled directly to image memory 12, processing circuit 14 writing back corrected data to image memory 12 for use by display device 16 and/or camera 10, may be coupled directly to processing circuit 14, processing circuit 14 correcting the data when it is supplied from camera 10.

Figure 2:
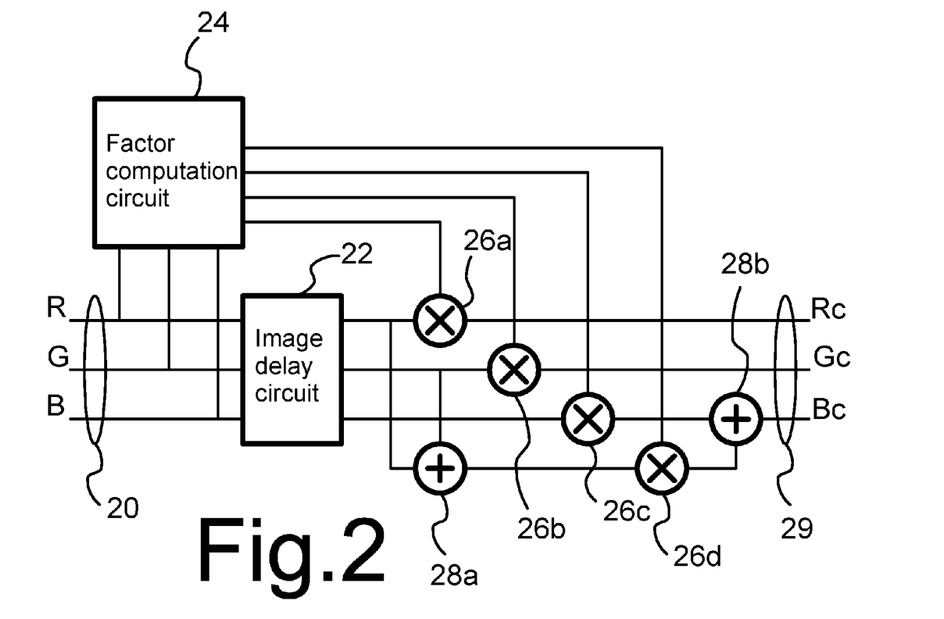
FIG. 2 shows a schematic signal processing architecture FIG. 3a,b illustrates color corrections by means of a color triangle

FIG. 2 shows a schematic signal processing architecture implemented by processing circuit 14. Herein a set of inputs 20 is used, each input for receiving a stream of signal values of a respective color component for successive image locations. The schematic signal processing architecture comprises an image delay circuit 22, a factor computation circuit 24, multipliers 26*a-d*, and a first and second adder 28*a,b*. Factor computation circuit 24 has inputs coupled to the set of inputs 20 and outputs coupled to multipliers 26*a-d*. Image delay circuit 22 is used to store an image factor computation circuit 24 computes factors to be used to correct the image. In embodiments wherein this is not needed, image delay circuit 22 may be omitted, its inputs being coupled to its outputs (for example when the image is part of a set of similar images, such as a video stream, factor computation circuit 24 may determine the factors from a preceding image).

In the illustrated embodiment with image delay circuit 22, image delay circuit 22 has inputs coupled to the set of inputs 20 and a first, second and third output 23*a-c* coupled to a first, second and third multiplier 26*a-c* respectively. Moreover, the first and second output 23*a,b* are coupled to inputs of first adder 28*a*. First adder 28*a* and third multiplier 16*c* have outputs coupled to a fourth multiplier 26*d*. Third and fourth multiplier 28*c,d* have outputs coupled to second adder 28*b*. The outputs of first and second multiplier 26*a,b* and second adder 28*b* form a set of outputs 29 each for producing a stream of corrected values for a respective color component for successive image locations.

In an alternative embodiment, the inputs of first adder 28*a* may be coupled to the outputs of first and second multipliers 26*a,b*. In another alternative embodiment, additional multipliers (not shown) may be provided between an image delay circuit 22 and the inputs of first adder 28*a*, factor computation circuit 24 having further outputs coupled to the additional multipliers.

In an embodiment factor computation circuit 24 computes factors from averages of respective color components, the average being taken over a collection of image locations, for example for an entire image. Factor computation circuit 24 computes the factors to provide for corrected output color components that correspond to interpolation between a first and second corrected color component vectors and optionally an interpolation in a triangle between these first and second corrected color component vectors and the original color component vector from the input image. Herein an interpolation is a weighted sum of these vectors, with zero or positive weights that sum to one.

Herein the first corrected color corresponds to an invertible transformation of the original color component vector. E.g. a linear transformation may be used such as obtained by multiplying the components by respective factor, selected so that the transformation a characteristic color component vector for the into image is transformed to a target color component vector that is a grey vector (e.g. R=G=B). Any standard white correction may be used. Herein the second corrected color corresponds to a projection, in the case of three component color vectors a projection of the original color component vector onto a two-dimensional plane in vector space. Preferably the plane is a plane that contains all color component vectors that correspond to grey values. The projection may correspond to computing one color component from one or more of the others.

Interpolation between such first and second corrected color component vectors provides for an adaptable correction that can be adapted under control of a single parameter, the interpolation coefficient (as used herein an interpolation coefficient is a parameter that control the position along a series of successive interpolated vectors between vectors between which the interpolation is made, or between a pair of legs of the triangle if the interpolation is made between three points at the corner of that triangle). In the case of interpolation between such first and second corrected color component vectors, the interpolation coefficient controls the interpolated position between the first and second corrected color component vectors). It has been found that the range of corrections obtainable by adapting this single parameter contains most useful corrections. For example, it has been found in the case of underwater imaging, when using the blue color component as the component that is computed from the other color components (R, G), the range of corrections obtained under control of the interpolation coefficients corresponds to corrections that are useful over a range of under water depths. Because only a single parameter needs to be adjusted, the adjustment can be performed automatically, for example by selecting the interpolation coefficient dependent on a ratio between the one component and one of the other components or a combination of these other components, interpolated values increasingly closer to the second corrected color component vector being used with decreasing value of this ratio.

In the option wherein the interpolation is in the triangle between the first and second corrected color component vectors and the original color component vector, a second interpolation coefficient has to be set, due to the additional dimension of the interpolation space. This second interpolation coefficient may be set to a predetermined value, for example based on user selection. In combination with automatic selection of the first interpolation coefficient this provides for effective user control.

Figure 3A:
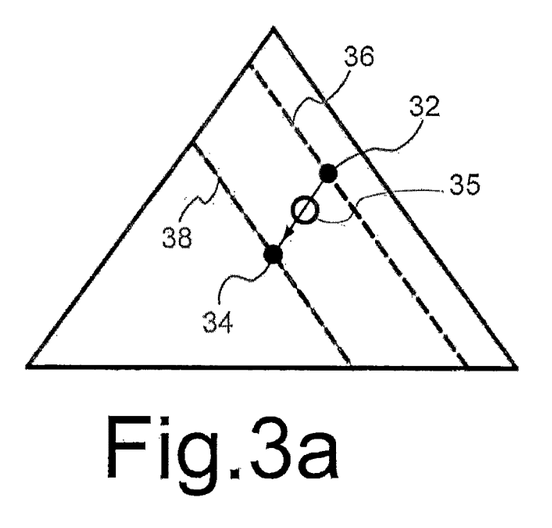

FIG. 3*a* illustrates the relation between the original color components and the first corrected color component vector in a color triangle. A first dot 32 indicates a characteristic value of the color components in the input image, such as the averages of the color components taken over all image locations. The first corrected color component vector is the result of a color transformation that ensures that the characteristic value of the first corrected color component vector is moved towards a target value, such as a colorless grey value. This transformation is a one to one mapping, each combination color components being mapped to one mapped combination and vice versa.

In FIG. 3*a*, the target is illustrated by a second dot 34 at the white point of the color triangle. In an embodiment the color transformation may map first dot 32 onto second dot 34, i.e. it may map the characteristic value of the color components of the input image onto the target.

The color transformation also modifies the color components corresponding to other points represented in the color triangle. As a general trend, all points will be displaced substantially in the same direction as the characteristic value, be it that the amount of displacement will depend on the color component vector that is transformed. For example, when the characteristic value 32 is mapped onto the target 34, points on a line 36 with equal blue fraction as the characteristic value 32 are mapped one to one onto a line 38 through the target 34. In the example of FIG. 3a this involves an expansion of a range of variation of the blue component values around the original line 36 to an expanded range around the mapped line 38.

The first corrected color component vector for an image location may correspond to a standard white correction. For example if RGB color components are used with values R(x,y), G(x,y), B(x,y) at an image location with coordinates x, y the first corrected color components R'(x,y), G'(x,y) and B'(x,y) may be expressed as $$R'(x,y)=R(x,y)*FR$$

$$G'(x,y)=G(x,y)*FG$$

$$B'(x,y)=B(x,y)*FB$$

In an embodiment, FR=<G>/<R>, FG=1 and FB=<G>/<B>, wherein <R>, <G> and <B> denote averages of the color components over the image (or over one or more reference images, in the embodiment wherein the factors are not determined from the image itself). This correction has the effect that the averages of the corrected color components are equal <R'>=<G'>=<B'>, i.e. that the average is a grey value with zero color saturation. However, other selections of the factors FR, FG, FB may be used that have the effect of reducing color saturation of the average. As will be noted these embodiments use the averages <R>, <G>, <B> as the characteristic value that is used to define the transformation for transforming the color components of the input image to the first set of corrected color component values. However, other characteristic values may be used instead. For example the color components of the image location with highest intensity in the input image may be used as the characteristic value, or an average of the color components of the image locations with at least a predetermined fraction of the highest intensity.

In an embodiment, the factors FR, FG, FB may include a common dependence on the original color components R(x,y), G(x,y), B(x,y) of the color components at the image location that are transformed. In a further embodiment the transformation may include any further factor C that is common to all color components, so that it does not affect the mapping to a grey value. Thus for example intensity may be kept unchanged by using FR=FR0*C, FG=FG0*C, FB=FB0*C, where C=(R(x,y)+G(x,y), +B(x,y))/(FR0*R(x,y)+FG0*G(x,y)+FB0*B(x,y)). In a further embodiment, the first corrected color components may be interpolations between the original color components and the color components above. As illustrated in FIG. 3a, in this further embodiment the color transformation may map the first dot 30 onto an interpolation between first and second dot, as indicated by circle 35. Expressions for this transformation are as follows:

$$R'(x,y)=R(x,y)*FR*W+(1-W)*R(x,y)$$

$$G'(x,y)=G(x,y)*FG*W+(1-W)*G(x,y) \text{ or } G'(x,y)=G(x,y) \text{ if } FG=1$$

$$B'(x,y)=B(x,y)*FB*W+(1-W)*B(x,y)$$

Herein W is an interpolation coefficient in the interval from zero and one. The interpolation coefficient W may have a predetermined value of 0.8 for example.

Figure 3B:
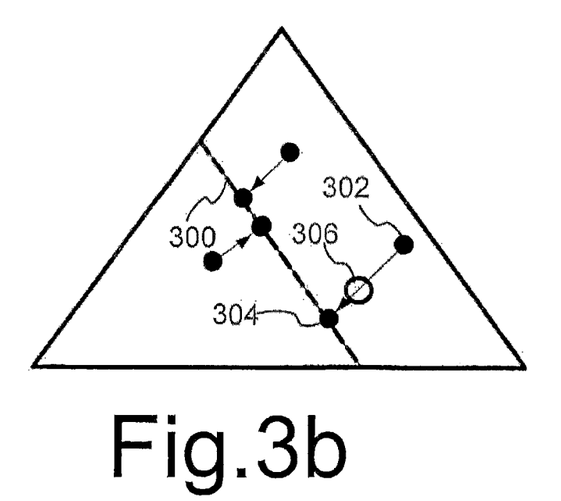

FIG. 3b illustrates the second corrected color components by means of a color triangle. In an embodiment the second corrected color components are the result of a color mapping that map all points in the color triangle onto a line 300 of colors. In FIG. 3b the mapping for exemplary points is indicated by arrows. In this embodiment this is a degenerate mapping: each point on the line 300 is a map of a plurality of different points in the color triangle. In general terms, corrected color components with the same R and G fraction but different blue fractions map onto a same point on line 300, irrespective of the blue fraction. The second corrected color components R"(x,y), G"(x,y), B"(x,y) for the image location may correspond to a color component vector wherein one of the color components is determined based on the values of the other color components. For example $$R''(x,y)=FR'*R(x,y)$$

$$G''(x,y)=FG'*G(x,y)$$

$$B''(x,y)=(FR'*R(x,y)+FG'*G(x,y))/2$$

The factors FG', FR' need not be the same as for obtaining the first set of corrected color component. In an embodiment FR'=FG'=1, but other values may be used, such as FG'=1 and FR'=<G>/<R> for example.

In a further embodiment, embodiment the color mapping may map each original point 302 onto an interpolated point 306 between the original point 302 and the point 304 on the line 300 to which the degenerate mapping maps the original point 302. As may be noted, such an interpolation results in a mapping that contracts the distances of color points in the color triangle towards line 300 in the towards points determined from the R and G color components, without reducing it to that line 300.

In the further embodiment, the second corrected color component vector may be interpolations between the original color components and the second set above:

$$R''(x,y)=W*FR'*R(x,y)+(1-W)*R(x,y)$$

$$G''(x,y)=W*FG'*G(x,y)+(1-W)*G(x,y)$$

$$B''(x,y)=W*(FR'*R(x,y)+FG'*G(x,y))/2+(1-W)*B(x,y)$$

When FR'=FG'=1 this simplifies to $$R''(x,y)=R(x,y)$$

$$G''(x,y)=G(x,y)$$

$$B''(x,y)=W*(R(x,y)+G(x,y))/2+(1-W)*B(x,y)$$

In an embodiment, the interpolation coefficient W for the second color component vector is the same as that for the first color component vector. In another embodiment these interpolation coefficients may be different. Use of the same interpolation coefficient W simplifies the correction.

Factor computation circuit 24 computes factors that provide for corrected output values Rc(x,y), Gc(x,y) and Bc(x,y) that are interpolations between the first and second sets of corrected color components:

$$Rc(x,y)=A*R'(x,y)+(1-A)*R''(x,y)$$

$$Gc(x,y)=A*G'(x,y)+(1-A)*G''(x,y)$$

$$Bc(x,y)=A*B'(x,y)+(1-A)*B''(x,y)$$

The interpolation coefficient A between the first and second corrected color component vector plays an important role. This interpolation coefficient is selected dependent on average image content, or on the content of one or more reference images that are considered to contain similar content as the image. In one embodiment, factor computation circuit 24 operates based on $$A=H(<B>/<G>)$$

Herein H( . . . ) is a function that increases from one to zero when its argument increases from one to zero. H may be the identity function of its argument or a square function of its argument for example:

$$A=<B>/<G> \text{ or } A=(<B>/<G>)^2$$

This has the effect that in images where the blue component B is more attenuated relative to the green component the interpolated corrected color component vector Rc(x,y), Gc(x,y) and Bc(x,y) will be closer to the second corrected color component vector than for images wherein the blue color component are less attenuated relative to the values of the green color component.

As will be appreciated the combination of the computation of the interpolation and the first and second corrected color component vector can be integrated in a single expression:

$$Rc(x,y)=A*FR*R(x,y)+(1-A)*FR'*R(x,y)$$

$$Gc(x,y)=A*FG*G(x,y)+(1-A)*FG'*G(x,y) \quad \text{or}$$
$$Gc(x,y)=G(x,y) \text{ if } FG=FG'=1$$

$$Bc(x,y)=A*FB*B(x,y)+(1-A)*(FR'*R(x,y)+FG'*G(x,y)/2$$

In the further embodiment wherein the first and second corrections are also results of interpolation, $$Rc(x,y)=A*FR*W*R(x,y)+((1-A)*W*FR'+(1-W))*R(x,y)$$

$$Gc(x,y)=A*FG*W*G(x,y)+((1-A)*W*FG'+(1-W))*G(x,y)$$

$$Bc(x,y)=A*FB*W*B(x,y)+(1-W)*B(x,y)+(1-A)*W*(FR'*R(x,y)+FG'*G(x,y))/2$$

From these equations the factors that factor computation circuit 24 supplies to multipliers 26a-d can be derived: the factor for first multiplier 26a is $$A*FR*W+(1-A)*W*FR'+(1-W)$$

The factor for second multiplier 26b is $$A*FG*W+(1-A)*W*FG'+(1-W)$$

The factor for third multiplier 26c is $$A*FB*W+(1-W)$$

When the factor for fourth multiplier 26d is $$(1-A)*FG'*W/2$$

As noted, in an embodiment FR=<G>/<R>, FG=1, FB=<R>/<B> and A=<B>/<G>, FG'=1, FR'=1 dependent on averages <R>, <G>, <B> of the color components of the image and W has a predetermined value, for example 0.8. Herein it has been assumed that the interpolation coefficient W is the same for both sets of corrected color components. Different expressions result if different interpolation coefficients W, W' are used:

$$Rc(x,y)=A*FR*W*R(x,y)+((1-A)*W*FR'+(1-W))*R(x,y)$$

$$Gc(x,y)=A*FG*W*G(x,y)+((1-A)*W*FG'+(1-W))*G(x,y)$$

$$Bc(x,y)=A*FB*W*B(x,y)+(1-W)*B(x,y)+(1-A)*W*(FR'*R(x,y)+FG'*G(x,y))/2$$

As may be noted, the corrected output color components are an interpolation between the original color components P0={R(x,y), G(x,y), B(x,y)}, a first corrected color component vector P1={FR*R(x,y), FG*G(x,y), FB*B(x,y)} and a second corrected color component vector P3={FR'*R(x,y), FG'*G(x,y), (FR'+FG')*B(x,y)/2}. In other words, the corrected output color components are a weighted sum of the vectors P0, P1 and P2, with positive weights whose sum is one.

In the color triangle the corrected output color components lie in a sub-triangle between points corresponding to these three sets of color components P0, P1, P2, near the leg P1-P2 (preferably W>0.5), the interpolation coefficient "A" controlling the position between the legs P0-P1 and P0-P2 of the sub-triangle. As shown in FIG. 3a, herein P1 is the result of a color component scaling that maps a characteristic color component vector such as a color component average on to a target such as a white point and that maps other sets of color components one to one to other values. As shown in FIG. 3b, P2 is the result of a color component projection mapping that maps color component combinations from a three dimensional color space onto a two dimensional plane. Projection mapping is many to one: each resulting color component set P2 can be the result of mapping any one of a plurality of original sets of color components P1.

By providing for component ratio dependent interpolation towards such a projection mapping, images obtained with increasing damping of a color component can be handled. In an underwater camera for example, the range of blue component values decreases with depth. In this case, the interpolation factor A makes it possible to compensate for depth. In an alternative embodiment, the under water camera may comprise a pressure sensor, and the processor may be configured to set the interpolation factor dependent on a sensing result of the pressure sensor. The system may comprise a look-up table memory for example, storing values for translating sensing results to interpolation factor values A, or to factors.

Although embodiments have explained in terms of signals representing RGB color components, it should be appreciated that the same color correction can be applied to signals that use a different representation, such as an YUV representation, or any other representation by components that are a one to one function of the RGB components and vice versa. Furthermore, although an explanation has been given in terms of correction of color components R(x,y), G(x,y), B(x,y) for individual image locations with coordinates x,y it should be appreciated that the correction may also be applied to coefficients that represent the color components for image locations collectively, such as DCT transform coefficients of the image location dependent color components R(x,y), G(x,y), B(x,y) for blocks op image locations.

Although embodiments have been shown with wherein the blue color component is given special treatment according to the second correction, it should be appreciated that in other embodiments other components may receive this treatment instead of the blue component. Furthermore, it should be appreciated that instead of giving such a treatment to one of the RGB components, the special treatment may be given to a composite component that is a combination of RGB components.

Although embodiments have been shown with examples of the first and second corrections using specific formulas, it should be appreciated that different correction formulas may be used.

Although FIG. 2 shows a schematic signal processing architecture which can be implemented with actual multipliers and adders, it should be appreciated that this is not necessary. Alternatively, the architecture may be implemented using a programmable signal processor and a program that uses the same multiplier may be to perform the functions of the different multipliers of FIG. 2 by time sharing. As another alternative, a general purpose processor with a program for implementing the architecture may be used.

Figure 4:
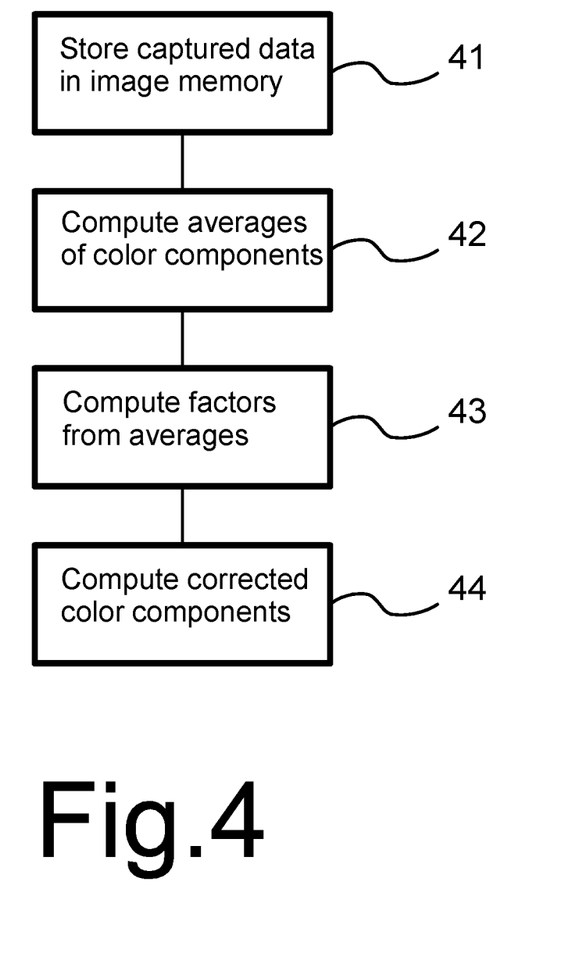
FIG. 4 shows a flow chart of image processing

FIG. 4 shows a flow chart of image processing implementing the color correction. In a first step 41, data representing an image captured by camera 10 is stored in image memory 12. This step may be performed by circuitry in camera 10 or by an interface circuit (not shown) between camera 10 and image memory 12. In a second step 42, processing circuit 14 computes averages of the color components, the average being taken over the locations in the image. In the embodiment wherein the factors are not determined from the image itself, the averages may be computed from one or more reference images.

In a third step 43, processing circuit 14 computes factors from the averages. These factors include the interpolation coefficient A for interpolating between the first and second correction. As described the interpolation coefficient may be selected as a ratio $<B>/<G>$ between the average of the blue and green color components in the image, or a function of this ratio. Expressions for computing the factors from the averages have been discussed in the preceding.

In a fourth step 44, processing circuit 14 computes the corrected color components for the image positions in the image using the factors determined for the image in third step 43. Processing circuit 14 may use a loop wherein the corrected color components are computed for different image positions successively for example. In an embodiment this comprises computing both the first and second corrected color component vector and computing interpolations from the computed first and second set for use as the corrected color components. Alternatively, corrected color components corresponding to the interpolation may be computed directly, as described in the preceding. Processing circuit 14 may store the computed corrected color components in image memory 12 and/or supplied them to display device 16 to control the content of the displayed image.

Although embodiments have been shown wherein the correction is based on averages $<R>$, $<G>$, $<B>$ taken over the entire image, it should be appreciated that in other embodiments different types of average may be used. For example, a weighted average may be used, wherein different image locations are weighted differently, or that average may be obtained from image color components in a part of the image only.

A computer program with machine readable instructions for making a programmable computer execute the described method may be provided on a computer readable medium, such as an optical or magnetic disk, a (non-volatile) semiconductor memory etc.

The part of the image used to determine the averages for the correction of the color components of an image location may depend on the image location. A sliding window may be used, so that for respective image location the averages are taken from a window in the same predetermined relative spatial relation to the respective image locations. Similarly, if a weighted average is used, weights dependent on relative spatial relation to the respective image locations may be used to determine the averages for correcting the color components for the respective image location. Other windows/averages may be used for other image locations, for example near the boundaries of the image. In another embodiment, the selection of the windows/weights may be made dependent on image content.

The method is particularly advantageous for processing a video stream (i.e. a sequence of images for successive display. Use of a gradually varying interpolation coefficient A reduces artifacts that would otherwise be disturbing during video display.

In addition contrast enhancement may be applied to the image. Basically, determining contrast enhanced pixel values $I'(r)=G*(I(r)-<I>)+<I>$ for pixel locations r involves amplifying the intensity deviations $I(r)-<I>$ from the average intensity $<I>$ by an amplification factor G. Instead of the factor an amplification function $G(I(r)-<I>)$ may be used, which is linear for relatively small deviations and levels off for larger deviations. Contrast enhancement may be performed by transforming RGB values to intensity plus color vector values, such as Y+UV values and amplifying deviations of the intensity component (e.g. I=Y), and optionally amplifying the color vector in correspondence with the amplification of the intensity, optionally followed by back-conversion to the original color representation. Instead of YUV other transformed color transformations may be used, e.g. transformed values where I=R+G+B. In other embodiments, all color components for an image location may be amplified using common factor computed from local deviation of the intensity from an average intensity.

The average $<I>$ used for contrast enhancement may be derived from average R, G, B values. I an embodiment, the averages used for the determining the interpolation coefficient A may be used for the contrast enhancement as well. In one embodiment any one of the described color reconstruction methods may be applied and the same method may be applied to the averaged R, G, B determined from the image for determining the interpolation coefficient A, to derive the averages for contrast enhancement. In an alternative embodiment, the contrast enhancement may be applied directly to the original components before color correction, and/or in combination with the color correction, by integrating the mathematical expressions for the color correction and edge enhancement.

In a further embodiment, edge preserving contrast enhancement may be applied, as described in WO 2009/078717, using averages computed using weighted averages using image gradient dependent weighting coefficients (e.g. dependent on the detection of edges). Methods of determining image gradients dependent averages from WO 2009/078717 are incorporated by way of reference herein. In WO 2009/078717, these averages are used for contrast enhancement. In an embodiment, the averages computed using these methods are used both to compute the interpolation coefficient A for color correction and to compute contrast enhancement of the image values from a same image. This reduces the computational load for processing circuit 14 and if provides for consistency between contrast enhancement and color correction, which reduces artifacts. In other embodiments, different averaging methods may be used for contrast enhancement and color correction.

Processing circuit 14 may be provided with a program to apply a combination of contrast enhancement and color correction as described. In addition to color correction a filtering operation to remove speckle type noise from under water images due to particles floating in the water.

The invention claimed is:

1. An image color correction method, wherein a corrected image is computed from original color components of original color component vectors in an input image, the method comprising the steps of:
   computing color components of the corrected image corresponding to an interpolation between a first and a second corrected color components vectors, wherein
   the first corrected color component vector corresponds at least partly to scaling all color components of the original color component vectors from the input image by factors that reduce a deviation of a characteristic color component vector for the input image from a target vector, and wherein
   the second corrected color component vector corresponds to at least partial replacement of at least one of the original color components of the original color component vectors from the input image by values computed from further ones of the original color components other than said at least one of the original color components from the input image;
   computing an interpolation coefficient from a ratio of an average value of the at least one of the original color components of the original color component vectors or one or more reference images and an average obtained from one or more of the further ones of the original color components or the one or more reference images;
   controlling a position of the interpolation between the first and second corrected color component vectors by said interpolation coefficient, the position being moved increasingly toward the second corrected color component vector with decreasing values of said ratio.

2. The image color correction method according to claim 1, wherein the corrected image correspond to an interpolation between the original color component vector from the input image, a first result of a color transformation comprising scaling all color components and a second result of a color space projection comprising replacement of at least one of the original color components of the original color component vectors from the input image by values computed from the further ones of the original color components.

3. The image color correction method according to claim 1, wherein the first corrected color component vector corresponds to a result of a one to one color transformation wherein the color components are multiplied by scale factors that map the characteristic color component vector to a grey vector, or to a mapped color vector between the characteristic color vector and the grey vector.

4. The image color correction method according to claim 1, wherein color components of the characteristic color component vector are averages of the original color components.

5. The image color correction method according to claim 1, wherein the second corrected color component vector corresponds to a result of a projection wherein the color components are mapped dependent on the further ones of the original color components, or to a mapped color vector between the characteristic color vector and the result of the color projection.

6. The image color correction method according to claim 1, wherein the at least one of the original color components is the blue color component.

7. The image color correction method according claim 1, wherein the at least one of the original color components is computed by applying respective factors determined from the characteristic color vector to a sum of the further ones of the original color components in the input image and to the at least one of the original color components from the input image respectively, and the further ones of the original color components are computed by applying one or more further respective factors to one or more of the further ones of the original color components from the input image respectively.

8. The image color correction method according to claim 1, wherein the first and second corrected color component vector are computed from the color components of the input image, and the corrected image is computed by interpolating between the first and second corrected color component vector.

9. A non-transitory tangible computer readable medium, comprising instructions for a programmable computer that, when executed by the programmable computer, causes the programmable computer to execute the method of claim 1.

10. The image color correction method according to claim 1, comprising contrast enhancement by amplifying deviations of image intensity from an averaged image intensity, using an averaged image intensity derived from the average values used for computing an interpolation coefficient.

11. The image color correction method according to claim 10, wherein the average values are local average values, computed by means of weighted averaging using image gradient dependent weighting coefficients.

12. An image processing system configured to compute a corrected image from original color components of original color component vectors in an input image, the system comprising:
   a module for computing an interpolation coefficient from a ratio of an average value of at least one of the original color components of the original color component vectors from the input image or one or more reference images and an average obtained from one or more further ones of original color component values other than said at least one of the original color components from the input image or the one or more reference images;
   a module for computing color component vectors of the corrected image corresponding to an interpolation between a first and second corrected color component vectors, the module for computing color component vectors of the corrected image controlling a position of the interpolation between the first and second corrected color component vectors by said interpolation coefficient, the position being moved increasingly toward the second corrected color component vectors with decreasing values of said ratio, wherein
   the first corrected color component vector corresponds at least partly to scaling all color components from the input image by factors that reduce a deviation of a characteristic color component vector for the input image from a target color component vector, and wherein
   the second corrected color component vector corresponds to at least partial replacement of the at least one of the original color components by values computed from the further ones of the original color components.

13. The image processing system according to claim 12, wherein the first corrected color component vector corresponds to a result of a one to one color transformation wherein the color components are multiplied by scale factors that map the characteristic color component vector to a grey vector, or to a mapped color component vector between the characteristic color component vector and the grey vector.

14. The image processing system according to claim 12, wherein color components of the characteristic color vector are averages of color components in the input image.

15. The image processing system according to claim 12, wherein the second corrected color component vector corresponds to a result of a color projection, wherein the color components are mapped dependent on the one or more further ones of the original color components, or to a mapped color vector between the characteristic color vector and the result of the many to one color mapping.

16. The image processing system according to claim 12, wherein the at least one of the original color components is the blue color component.

* * * * *